R. S. Bell
R. Davenport
INVENTORS

R. S. Bell
R. Davenport  INVENTORS

Patented July 16, 1946

2,403,902

UNITED STATES PATENT OFFICE 2,403,902

NITRIC ACID CONCENTRATION

Robert Sterling Bell, Tulsa, and Robert Davenport, Pryor, Okla., assignors to E. I. du Pont de Nemours & Company, Wilmington, Del., a corporation of Delaware Application August 18, 1943, Serial No. 499,042

4 Claims. (Cl. 23—160)

The present invention relates to the concentration of nitric acid and more particularly to an improved process and apparatus for increasing the capacity of a nitric acid concentrator. This invention also pertains to the denitration of spent nitration acids with the production of strong nitric acid therefrom.

According to the most commonly used methods of the prior art, a mixture of weak nitric acid and a dehydrating agent, usually sulfuric acid, is fed into the top of a packed column. This mixture passes down through the column countercurrent to water, nitric acid and other vapors produced by applying heat near the base of the column. Due to fractionation in the column, the percentage composition of the vapors decreases in water and increases in nitric acid as they approach the top of the tower. Concentrated nitric acid vapors are passed from the top of the column to a suitable condenser, while the residual sulfuric acid is withdrawn from the base thereof. Since the vapors passing up the column usually contain some undesirable nitrogen tetroxide, they are customarily conveyed through a bleacher intermediate the column and condenser.

Although the apparatus or any parts thereof used in conjunction with this invention may be of any desired size, for the purpose of convenience they are to be interpreted as being of substantially the same size as the corresponding parts of prior art apparatus with which they may be compared.

While the apparatus employed in the methods heretofore used for the concentration of nitric acid are very satisfactory at low rates of production, they nevertheless have serious disadvantages at high rates of production. For example, when a unit of a standard, widely used design is operated at production rates above approximately 36 tons 100% nitric acid per 24 hours, a high fluctuating pressure drop develops abruptly in the system, causing a holdup of the contents of the unit.. These conditions are referred to as flooding. The flooded unit may be returned to the unflooded state in about 20 minutes by decreasing the production rate to about 34 tons per day. Operating a unit flooded causes pressure fluctuations therein which loosen or blow out packings, thereby increasing maintenance costs and outage time. Occasionally, flooding causes acid to be blown out of the unit, particularly at the putty joints and the residual acid seal.

An object of the instant invention is to provide an improved method and apparatus for concentrating nitric acid. A further object is a method and apparatus for materially increasing the capacity of a nitric acid concentrator unit. A still further object is to provide a means of decreasing the pressure drop in portions of a nitric acid concentrator unit, which overload and flood at certain production rates, thereby substantially increasing the productive capacity thereof. Other objects will be apparent from the description hereinafter given.

We have found that the foregoing objects are accomplished and the prior art disadvantages overcome by cooling the fume line at any place between the dehydrating column and the "S" bend condensers, including the bleacher. Although any suitable cooling medium is applicable, we prefer to bring about said cooling by passing a film of water over that portion of the fume line intermediate the dehydrating tower and bleacher. This liquefies some of the nitric acid vapors passing through said portion of the fume line and removes same from the unit before they reach the "S" bend condensers, thus taking part of the load off said condensers and thereby decreasing the pressure drop therein. By this procedure we have discovered that the capacity of a nitric acid concentrator unit is increased approximately 25%.

A more comprehensive view of this invention may be obtained from a consideration of the following detailed description taken in connection with the accompanying diagrammatic representation forming a part of this specification, and in which like reference characters denote similar and like parts, with the understanding, however, that since said drawings show only a preferred way of practicing our invention it is not to be confined to any strict conformity with the depiction of the drawings but may be changed or modified so long as such alterations mark no material departure from the salient features of the invention as expressed in the appended claims.

Referring to the drawings generally, Figure 1 is an elevation view of a concentrator unit with the fume line cooling device attached.

Figure 1:
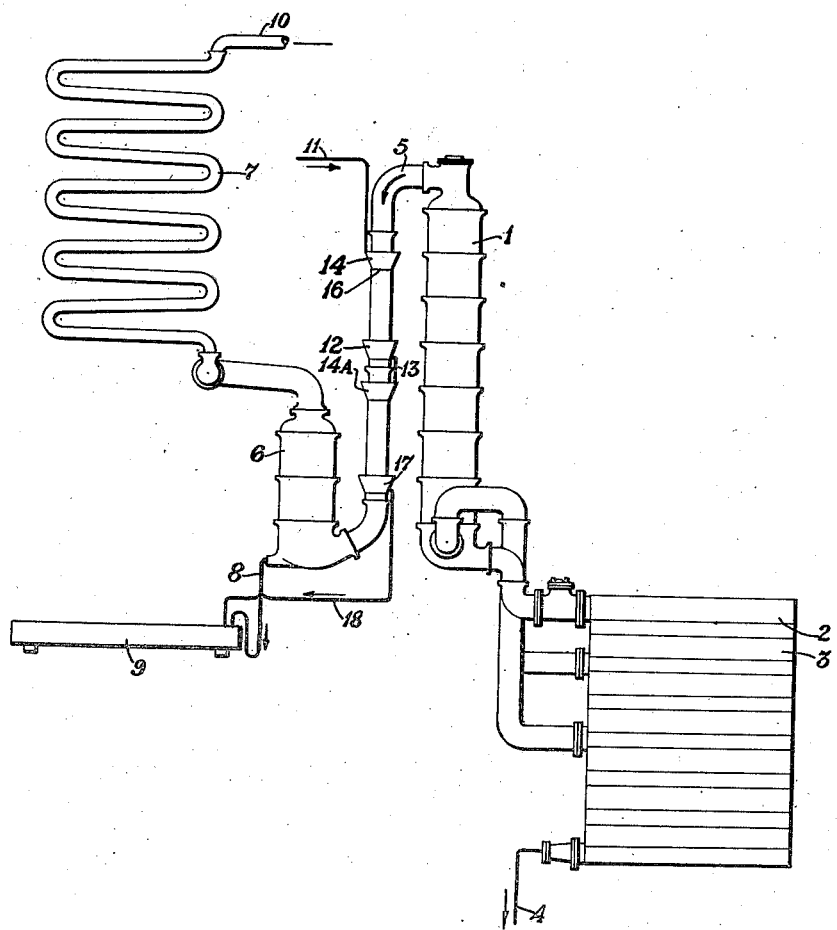

Referring to the drawings in greater detail for a more complete description of a preferred embodiment of the present invention, preheated mixed acid, for example, weak nitric acid and a dehydrating agent such as sulfuric acid, is fed into the top of a dehydrating tower 1 (Figure 1). This feed flows down the tower countercurrent to the nitrogen tetroxide, nitric acid and water vapors coming up from the bottom of the tower. In its progress down the tower, the hot mixture continues to absorb water vapors and give off nitrogen tetroxide and nitric acid vapors. Substantially all of the oxide and acid which is not vaporized as the feed flows down the tower is vaporized by the steam-jacketed 2 boiler tubes 3 near the base of the tower. While the nitric acid is boiled off as weak nitric vapors, the sulfuric acid remains in the boiler tubes and is exited through outlet 4. The temperature at the top of the tower is maintained between approximately 90° and 120° C. The vapors ascending the column, the majority of which consist essentially of nitric acid together with a small per cent of nitrogen tetroxide, issue from the dehydrating tower through a fume line 5 into a bleacher 6 and thence into an "S" bend condenser 7, in which the nitric acid vapors liquefy. This condensate flows back into the bleacher and through outlet 8 into the strong nitric acid cooler 9. Although nitrogen tetroxide vapors pass from the condenser through conduit 10 into absorption towers, some are brought back to the bleacher with the nitric acid condensate. However, the countercurrent flow of hot vapors strips substantially all of the remaining nitrogen tetroxide from said condensate.

A portion of the nitric acid vapor flowing through the fume line 5 is condensed by cooling said line with a falling film of water and is introduced into the strong nitric acid cooler 9 by way of conduit 8. In order to accomplish this, approximately twelve gallons of water per minute is introduced through pipe 11 into a distributor 14, from which it flows down the outside of the fume line as a film to the collector 12. The water flows from the base of said collector through pipe 13 which empties into a distributor 14A beneath the fume line joint 15, from which it flows down the fume line to the next joint and detours around this one as it did the preceding joint. These collectors are crimped at 16 to insure a uniform distribution of water. The water is led off from the bottom collector 17 by a drain pipe 18, leading into the strong nitric acid cooler 9. Thus the cooling water is kept off the putty joints. Such a device is particularly advantageous in accomplishing the desired cooling, since it renders the putty joints accessible at all times for inspection and maintenance and makes possible a uniform distribution of water at any rate of flow.

Figure 2:
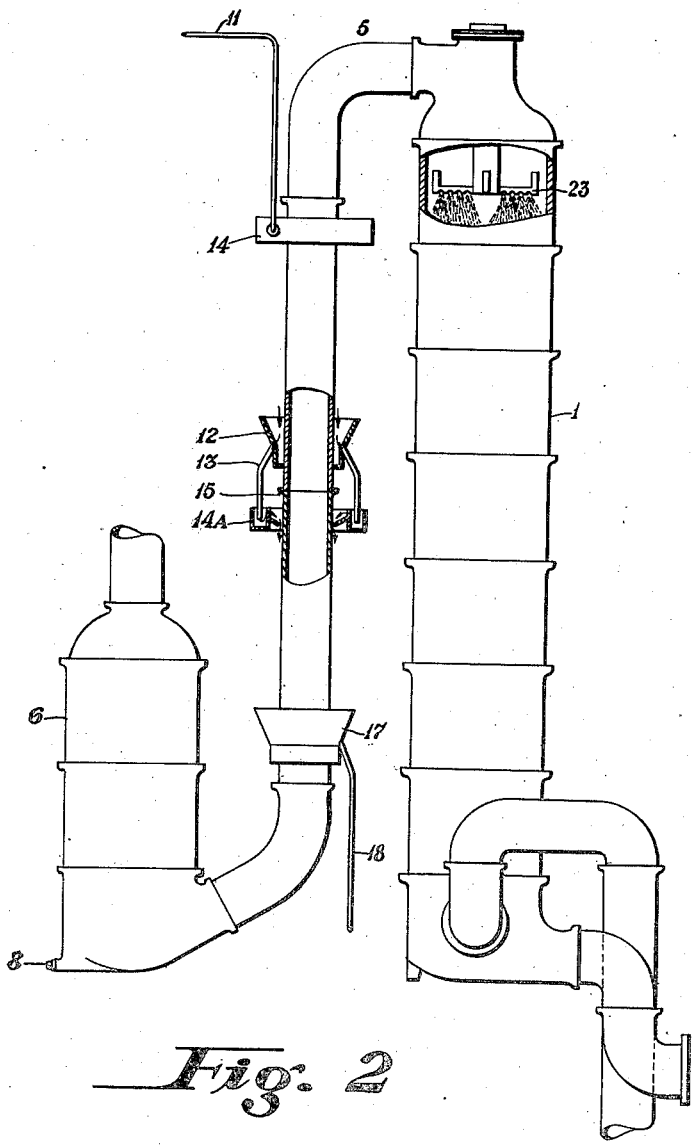
Figure 2 is a broken-out sectional view of an incomplete concentrator unit showing the arrangement of the fume line cooling device.
Figure 3:
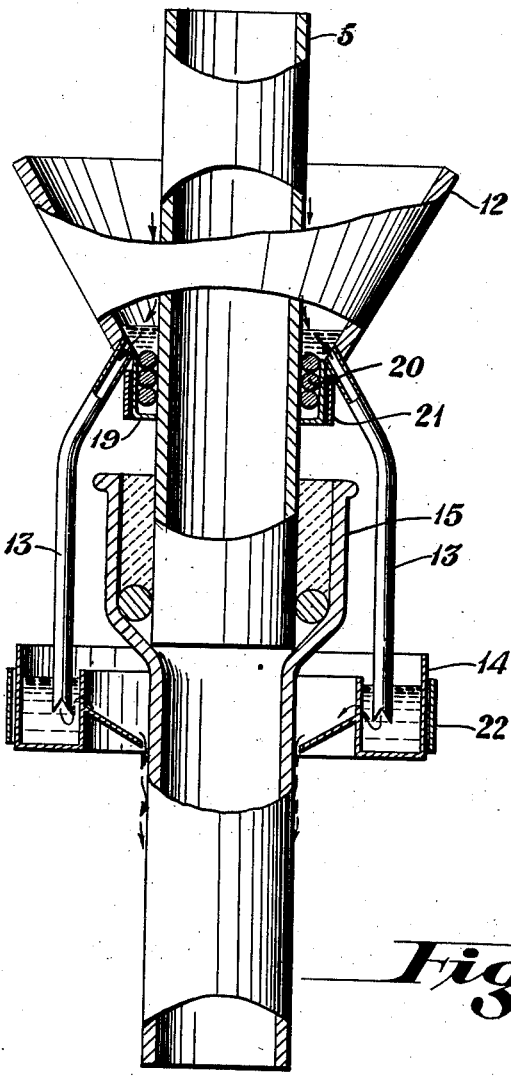
Figure 3 is a detail sectional view of one segment of said cooling device showing its detour around the fume line joints.

Figure 3 depicts a cross section of one segment of a cooling device having distributors 14, as shown in Figure 2. These distributors are slightly different from those of Figure 1. It is necessary to have a tight waterproof seal between the collector 12 and the fume line 5, which is assured by caulking the packing gland 19 with asbestos rope 20 soaked in hot tar or heavy oil, and asbestos roofing cement. A draw band 21 is fastened tightly around the packing gland to hold the collector in position. In joining together the two halves of the collector, asbestos roofing cement is used to make the joints watertight. The distributor 14 below the fume line joint 15 is held to said line by means of a draw band 22 around the outside of the distributor.

Thus, according to this invention, we are able to decrease the pressure drop in the condensers and thereby increase the capacity of nitric acid concentrator unit approximately 25% without sacrifice of concentration or purity of the product.

At the higher production rates the sulfuric acid content of the strong nitric acid increased to approximately 1.0%. This was reduced to less than 0.02% by means of a perforated cross 23 (shown in Figure 2) to distribute the mixed acid into the top area of the dehydrating tower 1 from six to twelve inches beneath the upper surface of the packing therein.

In all instances herein where reference is made to a tower or column, it is to be construed as being adequately provided with packing material or fractionating plates. These towers may be of any type dehydrating or fractionating tower or other satisfactory apparatus which will accomplish the desired result, and may be constructed either of acid-resistant iron, chemicalware, or any material which will serve the purpose.

Various changes and modifications may be made in practicing this invention in departure from the particular showing of the drawings and description as given, without, however, departing from the spirit of the invention as defined by the scope of the appended claims; therefore, the drawings and specification are illustrative only, while the following claims afford a measure of the scope of the invention.

We claim:

1. The process of concentrating nitric acid which comprises passing a mixture including nitric acid and a dehydrating agent down through a dehydrating column, driving off therefrom strong nitric acid vapors, conducting the evolved vapors from the top of said tower through a fume line, said fume line extending downwardly between the top of said column and a bleacher and being of sufficient length to supply a material extent of condensing surface, passing a liquid coolant downward over the exterior of said fume line to condense a portion of said vapors, withdrawing the condensate, liquefying the uncondensed vapors, stripping the undesirable gases from the resulting condensate, and withdrawing same as strong nitric acid.

2. The process of denitrating spent nitration acids which comprises passing a mixture including weak nitric acid and sulfuric acid as a dehydrating agent down through a dehydrating column, driving off therefrom strong nitric acid vapors, conducting the evolved vapors from the top portion of said column through a fume line, said fume line extending downwardly between the top of said column and a bleacher and being of sufficient length to supply a material extent of condensing surface, passing a film of cooling water downward over the exterior of said fume line to condense a portion of said vapors, withdrawing the condensate, passing the uncondensed vapors through a bleacher and into a condenser, stripping the undesirable gases from said condensate, and withdrawing the latter as strong nitric acid.

3. The process of concentrating nitric acid which comprises passing a mixture including nitric and sulfuric acids down through a dehydrating column, driving off therefrom strong nitric acid vapors, passing the residual mixture still containing some nitric acid through a series of boiling vessels and vaporizing substantially all of the remaining nitric acid as weak acid, conducting the evolved vapors from the top of said column through a fume line, said fume line extending downwardly between the top of said column and a bleacher and being of sufficient length to supply a material extent of condensing surface, passing a film of cooling water downward over the exterior of said fume line to condense a portion of said vapors, exiting said condensate near the base of the fume line, passing the uncondensed vapors through a bleacher and into a condenser, allowing the condensate to flow back into the bleacher countercurrent to said nitric acid vapors thereby stripping undesirable gases from said condensate, withdrawing this condensate as strong nitric acid, and passing said stripped gases from the condenser to absorption columns.

4. An apparatus for concentrating nitric acid which comprises a dehydrating tower adapted to become heated by hot vapors entering at the base thereof, a bleacher having an outlet therein, a fume line passing downwardly from the top of said tower into said bleacher, a condenser attached to the bleacher, connecting joints in said fume line capable of obstructing the normal flow of a film of cooling liquid down over the exterior of said fume line, collecting vessels above the individual joints adapted to contain the downflowing cooling liquid, distributing vessels below said individual joints, adapted to distribute cooling liquid over said fume line below said vessels, and conduits around each joint connecting each pair of collecting and distributing vessels, whereby efficient cooling of the fume line is promoted.

ROBERT STERLING BELL.
ROBERT DAVENPORT.